United States Patent [19]
Fraenkel

[11] Patent Number: 6,028,700
[45] Date of Patent: Feb. 22, 2000

[54] COLLAPSIBLE VIEWING INSTRUMENT

[76] Inventor: Amir David Fraenkel, Uziel St. 28/9, Jerusalem, 96424, Israel

[21] Appl. No.: 09/161,452

[22] Filed: Sep. 28, 1998

[51] Int. Cl.[7] .................................................. G02B 23/00
[52] U.S. Cl. ............................................ 359/408; 359/480
[58] Field of Search ................................. 359/399, 407, 359/408, 480, 481, 817

[56] References Cited

U.S. PATENT DOCUMENTS

| | | | |
|---|---|---|---|
| 4,772,747 | 9/1988 | Bresnahan | 359/408 |
| 4,964,709 | 10/1990 | Hoeptner | 359/408 |
| 5,206,757 | 4/1993 | Cheng et al. | 359/408 |
| 5,282,086 | 1/1994 | Goldstein | 359/407 |
| 5,899,345 | 5/1999 | Fuller et al. | 211/132.1 |

FOREIGN PATENT DOCUMENTS 0043117  2/1988  Japan ..................................... 359/407

*Primary Examiner*—Cassandra Spyrou
*Assistant Examiner*—Mark A. Robinson
*Attorney, Agent, or Firm*—Eric W. Trucksess; Peter A. Borsari

[57] ABSTRACT

A sturdy, reusable and collapsible viewing instrument for assisting in viewing distant objects that is assembled from a blank. The blank comprises two pivoting frames in which ocular and objective lenses are affixed. Domains of the blank are foldable along pre-etched fold lines to form parallel sides of the viewing instrument. Ideally, the blank dimensions approximate those of a standard credit card so that the viewing instrument may be stored in one's wallet or purse.

17 Claims, 3 Drawing Sheets

COLLAPSIBLE VIEWING INSTRUMENT

FIELD OF INVENTION

The present invention relates to reusable, collapsible viewing instruments which assist in viewing distant objects. Specifically, the present invention provides a monocular viewing instrument which is collapsible into a flat, credit-card sized shape that may be carried in a personal object holder such as a pocketbook or wallet.

BACKGROUND OF THE INVENTION

Collapsible viewing instruments are easily produced out of simple materials. They are lightweight and fold into a flat shape. These relatively compact products provide their users with the advantages of portability and low cost. Typical collapsible viewers have fold lines which divide the original card into several distinct surfaces; they usually have holes and tabs and sometimes also need an adhesive such as tape or glue. This structure of the collapsible viewers can cause some problems. For the user, assembly may be difficult. This design also may lack the sturdiness required for outdoor use in a rigorous setting. Indeed, some of these viewers are constructed as disposable viewing tools which are disposed of after a single use. Problems can also arise regarding the optical properties of the collapsible viewers: when configured for storage, a surface is folded above a lens, or a lens is folded directly above a second lens, thus, instead of protecting the lens, it may actually abrade or scratch the lens. In addition, these viewing instruments in which the distance between the ocular and the objective lens is short may not provide as much magnification. In the case of binocular construction, universality of utility can be hampered by the fact that not all user's eyes are spaced apart precisely the same distance between the dual ocular lenses.

Collapsible viewers generally have three different configurations: a viewing configuration in which the collapsible viewer is a three dimensional object, a storage configuration, and the manufacturing blank configuration. The manufacturing blank is a single thin layer, both long and wide. The manufacturing blank then undergoes assembly by gluing, folding, engaging flanges, etc., and then can assume either a storage or a viewing configuration. When configured for storage the viewer is relatively flat, but it still consists of several layers making it quite thick and relatively cumbersome. As a result, although collapsible viewers are lightweight and relatively compact they are still carried as a separate item in a bag or in the pocket. The current invention tries to improve several properties of the collapsible viewer, in particular compactness. This will make the instrument very easy to carry, not as a separate item but just like adding another credit card to the wallet.

Attempts have been made to provide collapsible viewing instruments. For example, U.S. Pat. No. 4,239,328, issued Dec. 16, 1980 to H. L. Justice, Sr., et al. shows a collapsible binocular and blank therefor comprising a semi-rigid sheet material which is foldable into a housing having dual objective and ocular lenses. A flap system depending from a roughly rectangular foldable panel is used to secure the sides of the housing. U.S. Pat. No. 4,964,709, issued Oct. 23, 1990 to Hoeptner, U.S. Pat. No. 4,773,747, issued Sep. 27, 1988 to W. M. Bresnahan and U.S. Pat. No. 4,486,079, issued Dec. 4, 1984 to K. Ueda each teach a binocular system in which the housing is secured by flaps depending from a rectangular panel. U.S. Pat. No. 4,846,553, issued Jul. 11, 1989 to R. Rice discloses another binocular viewer which is assembled from a blank having walls that cooperate to form a bellows-like structure which may be secured with tabs and adhesive tape.

U.S. Pat. No. 5,528,419, issued Jun. 18, 1996 to R. C. Murrey teaches a flat-format binocular kit comprising a corrugated blank from which elements are removed for assembly. The assembled binocular may be worn by the user in a fashion resembling eyewear.

U.S. Pat. No. 4,881,334, issued Nov. 21, 1989 to M. Brown and U.S. Pat. No. 3,756,699, issued Sep. 4, 1973 to R. L. Martin show collapsible monocular viewers. Brown demonstrates a single lens viewer assembled from a unitary blank which is folded upon itself to form a housing, the internal sides of which are magnified when viewed through the single lens. When this viewer is configured for storage and is folded into two, its length and width are those of a credit card. Martin presents a mailable disposable viewer in which the manufacturing blank provides a mailing envelope. The viewer is formed from a section of the blank which is folded upon itself so that a depending tab may be inserted into an integral slit.

U.S. Pat. No. 4,968,125, issued Nov. 6, 1990 to V. Rodriquez shows a magnifier having both an ocular lens and a "condenser" mounted in register at opposing ends of a collapsible rectangular housing. The device is presented as a "charm" which may be hung from a keychain or the like.

U.S. Pat. Des. No. 349,295, issued Aug. 2, 1994 to P. Weidemann and U.S. Pat. Des. No. 240,333, issued Jun. 22, 1976 to M. G. Chesnut show monocular devices having ocular and objective lenses mounted to opposing ends of rectangular housings which appear to be rigid structures.

Despite the teachings of the prior art, a need still exists for a sturdy, easily assembled, collapsible viewing instrument which may be used repeatedly in divers settings. Additionally, it would be desirable to provide a collapsible viewing instrument that may be carried conveniently in a person's wallet, pocketbook or other personal object holder.

SUMMARY OF THE INVENTION

Accordingly, it is a primary object of the present invention to provide a very compact collapsible viewing instrument which, when configured for storage, has length and width dimensions roughly approximating those of a standard credit card and which comprises a single layer of a thin material, so that the instrument is relatively small and thin and may be stored in a wallet or pocketbook in the manner of a credit card.

It is another object of the present invention to provide a collapsible viewing instrument with good magnification and lenses that will not get abraded or scratched, and which is portable and sturdy enough to be used repeatedly.

It is an additional object of the present invention to provide a collapsible viewing instrument that is easily assembled for use and readily collapsed for storage.

It is a further object of the present invention to provide a collapsible viewing instrument that may be manufactured readily and that presents an economic use of material.

Additional objects, advantages and novel features of the present invention will be set forth in part in the description which follows and in part will become apparent to those skilled in the art upon examination of the following specification or may be learned by practice of the invention. To the accomplishment of the above-related objects, this invention may be embodied in the forms illustrated in the accompanying drawings, attention being called to the fact, however, that the drawings merely are illustrative, and that changes may be made in the specific construction illustrated and described within the scope of the appended claims.

BRIEF DESCRIPTION OF THE DRAWINGS

The present invention will be better understood with reference to the appended drawing sheets, wherein.

DETAILED DESCRIPTION

Figure 1:
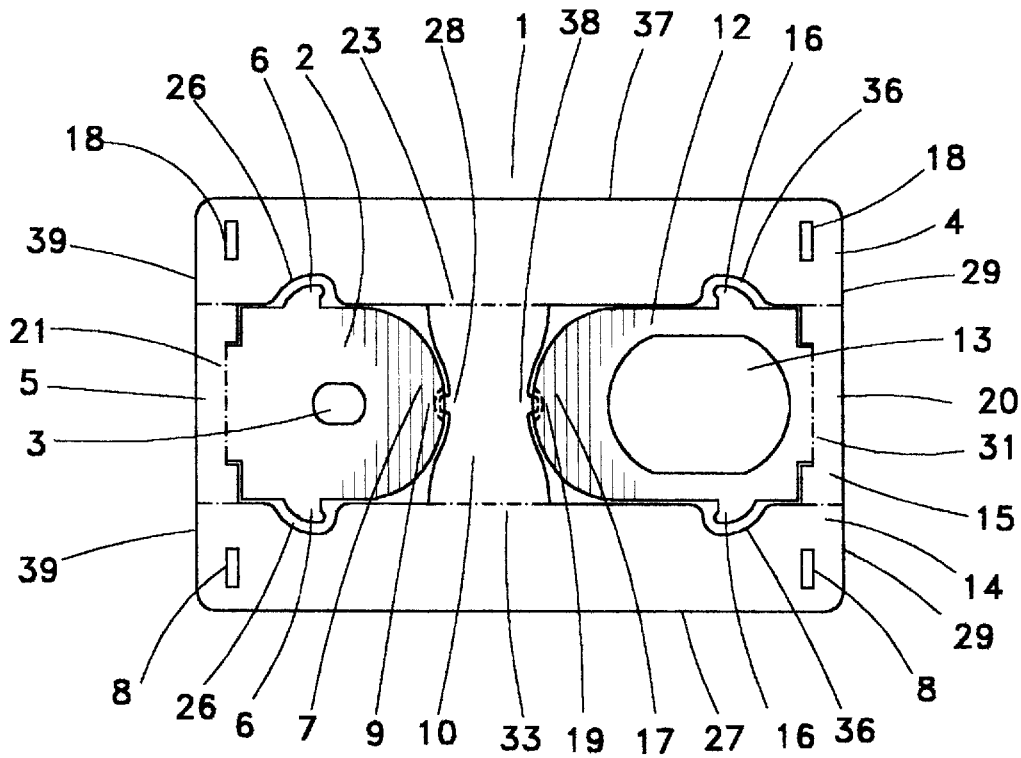
FIG. 1 is a top view of the collapsible viewing instrument of the instant invention when configured for storage.
Figure 2:
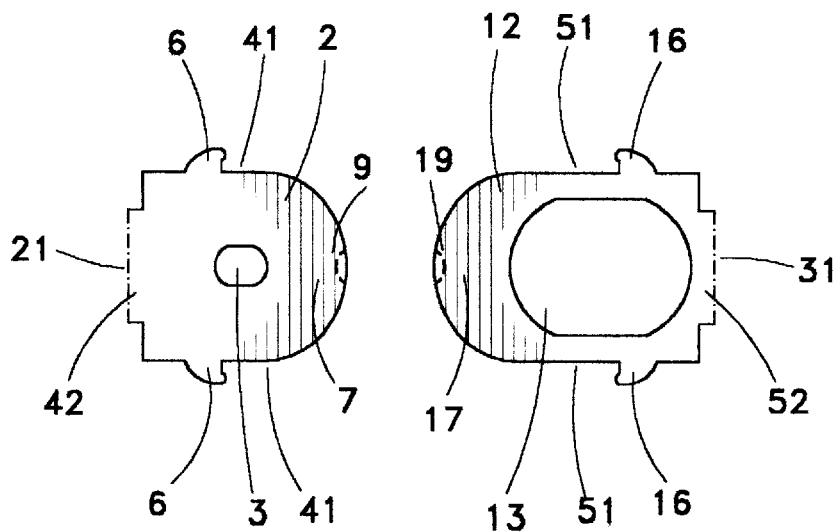
FIG. 2 is a side view of the isolated pivoting frame elements of the instant invention.
Figure 3:
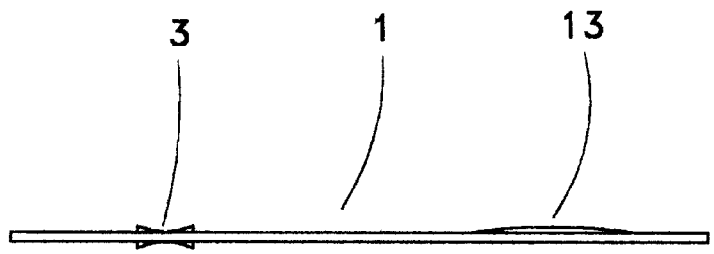
FIG. 3 is a right side view of the collapsible viewing instrument of the instant invention when configured for storage.

As shown in FIGS. 1 to 3, the collapsible viewing instrument or "instrument" 1 comprises a blank, hereinafter referred to as "the blank" or "the card." having any desired planar dimensions, but which preferably has the planar dimensions of a standard rectangular credit card and ideally has a thickness of about 1 mm. The card is constructed from a durable, semi-rigid material, suitable examples of which include nylon, polypropylene, polyethylene or cardboard which may have a matte, textured or smooth finish effected by glazing and/or calendering. Two pre-etched fold lines 23 and 33 run the length of the card and divide the card into three domains: a top domain 4, a central domain 20 and a bottom domain 14. The top domain and the bottom domain comprise essentially symmetric domains. For example, top domain 4 is bound by a top edge 37, side edges 29 and 39 and fold line 23 within which domain are two rectangular holes 18 spaced apart from each other along the length of the domain. Bottom domain 14 is bound by a bottom edge 27, side edges 29 and 39 and fold line 33 within which domain are two rectangular holes 8 spaced in identical fashion. As will be seen, when the collapsible viewing instrument is in use, the top and bottom domains will comprise opposing sides of the instrument.

Central domain 20 is the heart of the collapsible viewing instrument 1 and comprises pre-cut areas that form rounded, pivoting frames 2 and 12 into which are inserted an ocular lens 3 and an objective lens 13 each manufactured from a durable, scratch-resistant material.

As shown, each pivoting frame 2, 12 is formed from a rectilinear shape each having straight parallel sides 41 and 51 and each having a connecting end shown as rounded end 7. 17. respectively. However, it should be understood that the sides 41 and 51 need not be parallel. Moreover, said rounded ends alternatively could be straight and are proximal to one another within the area delineated by the blank. The pivoting frames 2, 12 are capable of being folded along pre-weakened etch lines 21, 31 located at ends 42, 52 of the pivoting frames respectively opposite from rounded ends 7, 17. The etch lines are integral with the instrument blank at surfaces 5 and 15, respectively which, as can be seen in FIG. 1, lie distally from one another on opposite ends of the instrument 1.

At the center of each rounded end 7, 17, of the pivoting frames 2, 12, cavities 9 and 19 may be disposed through the substance of the collapsible viewing instrument blank. Separating the two rounded ends and integral with the instrument blank is a central surface 10 which may have projections 28, 38 centrally located therein and each oriented away from one another toward a respective rounded end 7, 17. When the collapsible viewing instrument is not in use, such as when it is in storage within a wallet, the projections 28, 38 engage said cavities 9, 19 to prevent movement of the pivoting frames 2, 12 about the etch lines 21, 31 thereby preventing inadvertent damage to the instrument. Obviously, other means could be used to secure the pivoting frames in their storage position such as locking etch lines, locking hinges, contact pressure between the rounded ends 7, 17 and the central surface 10 or the like. As is seen in FIG. 3, the cross sectional profile of the collapsible viewing instrument 1 while not in use is flat whereas the ocular lens 3 is concave and the objective lens 13 is convex. The projection of neither lens is so great as to prevent the use of a case such as an envelope made of paper, rubber, cloth or polymeric material to protect the instrument in storage. The collapsible viewing instrument comprises a single layer of material when configured for storage, thereby presenting a minimum profile thickness and conserving material.

Returning to FIGS. 1 and 2, each pivoting frame 2, 12 is provided with a pair of flanges 6, 16 which project outwardly from the two sides 41 and 51. Accordingly, recesses 26 and 36 are cut into the instrument card to accommodate the flanges. The system of flanges 6, 16 and holes 8, 18 provides a means for securing the pivoting frames 2,12 in positions that permit use of the viewing instrument. Other means could be used to obtain this result such as adhesive strips, hook and loop fastening systems, articulable joints, locking hinges, locking etch lines or the like.

Figure 4:
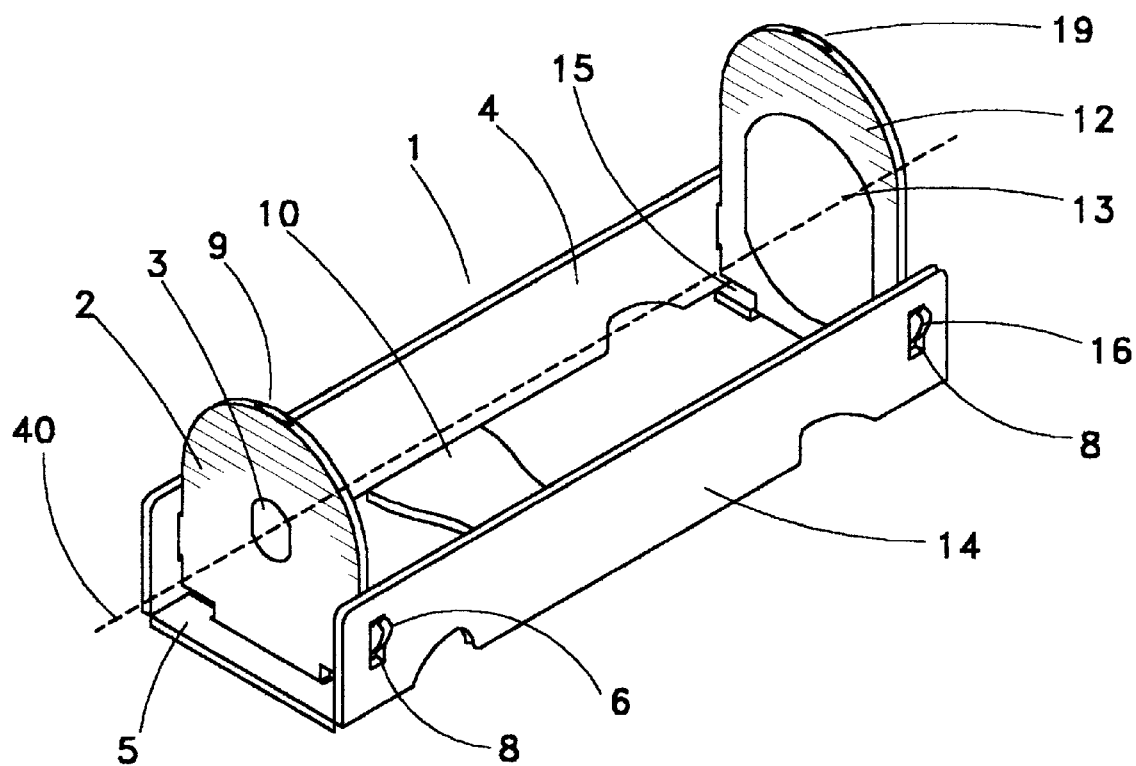
FIG. 4 is a side perspective view of the collapsible viewing instrument of the instant invention when configured for viewing use.
Figure 5:
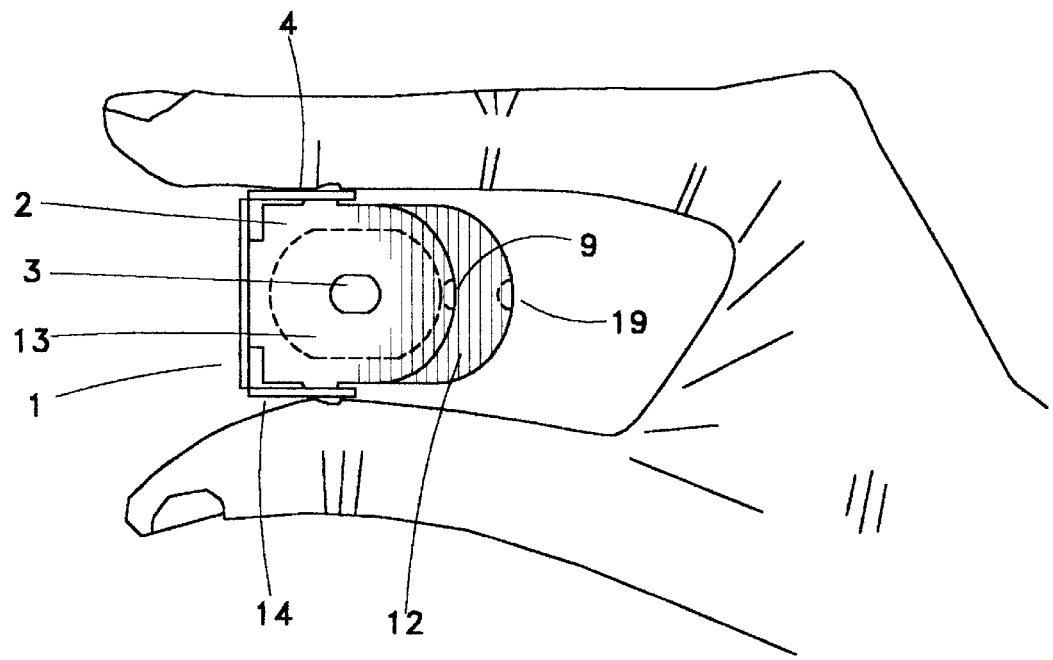
FIG. 5 is an environmental perspective view of the collapsible viewing instrument of the instant invention configured for viewing use.

Referring to FIGS. 4 and 5, the collapsible viewing instrument 1 is shown assembled for use. Pivoting frames 2 and 12 are folded upwardly and away from each other to an upright position by grasping each frame at the space especially provided between the lens 3, 13 and the rounded end 7, 17 to disengage the projections 28, 38 from the cavities 9, 19. Top and bottom domains 4, 14 are folded upwardly so that they form opposing vertical sides to the viewing instrument. Flanges 6, 16 engage slots 18, 8 and lock the pivoting frames into the upright position. Moreover, the flanges lock the top and bottom domains together so that the usable instrument is essentially a five sided box comprising top and bottom domains, the upright pivoting frames and the remaining central surface 10 of the central domain 20. In this construction, each of the pivoting frames 2, 12 is held tightly from three sides. As is seen from this manner of construction, by configuring the pivoting frames 2 and 12 to fold upwardly and outwardly from the center of the instrument 1, a maximum separating distance between the frames is permitted which provides the viewing instrument with a better magnification. Configured thusly, an economy of material is effected over previous binocular designs having surfaces that are folded inwardly from outward positions.

Referring to FIG. 5 in particular, a user views a distant object by holding the viewing instrument between the fingers and viewing through the ocular lens 3 which is now in register with the objective lens 13 along a common optical axis 40. As shown, the monocular viewer, whose pivoting frames and lenses have a rectangular elliptic shape. provides a relatively panoramic view. The collapsible viewing instrument is disassembled for a return to storage by merely disengaging the flanges 6, 16 from the slots 18, 8, unfolding the domains 4, 14 and pivoting frames 2, 12 back to the flat position and re-engaging the projections 28, 38 with the cavities 9, 19.

Manufacturing methods for the instant invention can include one-piece construction in which both the lenses and the body of the collapsible viewing instrument are fabricated from a semi-flexible transparent material. However, construction also may be from cardstock of any semi-flexible material into which transparent lenses 3, 13 may be mounted. Alternatively, pivoting frames 2, 12 could be separately manufactured with respective lenses and later attached to the framework of the viewing instrument. In such an embodiment, fold lines 21 and 31 would be replaced by hinges shown in FIG. 6 rather than being integral parts of the blank.

Figure 6:
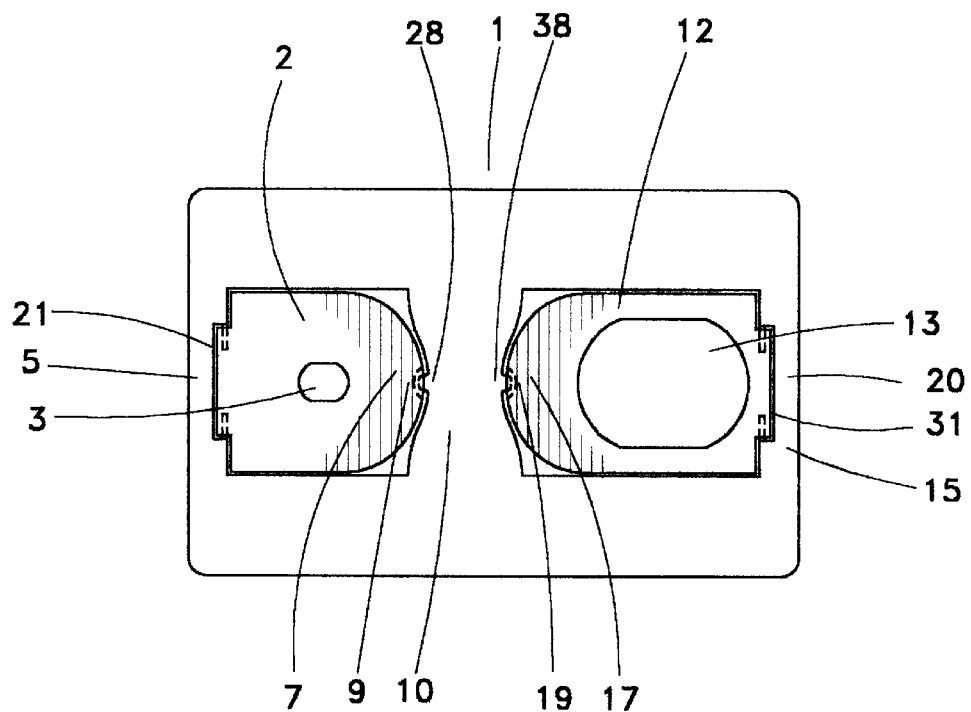
FIG. 6 is a top view of an alternative embodiment of the collapsible viewing instrument of the instant invention when configured for storage.

In an alternative, simplified embodiment illustrated in FIG. 6, the collapsible viewing instrument 1 may comprise merely the core features of the central domain 20, lacking both a foldable top domain and a foldable bottom domain (viz. FIG. 1, elements 4 and 14). In this simplified embodiment, the instrument comprises a blank 1 having two outwardly and upwardly pivoting frames 2 and 12 each having a lens, one of which being an ocular lens 3, the other of which being an objective lens 13. As in the preceding embodiments, suitable means would be provided to maintain the pivoting frames in an upright parallel position. Such means include, for example, pre-weakened etch lines which enable the pivotable frames to be stable at certain angles, such as the etch lines used in some tube and bottle corks, hinges in which the hinge pin is held tightly under pressure inside a mating female hinge so that the pivotable frame is stable at any point and moves only when pressure is applied, hinges which are locked or blocked at certain points, adhesive strips, hook and loop fastening systems, articulable joints and the like.

A case (not pictured) may be provided to fit the viewing instrument's unique dimensions. Ideally, the case is manufactured from a durable substance such as a relatively soft PVC film having a thickness of about 0.3 mm. Such a case may have an inner layer made of soft lens-protecting material. Because in the preferred embodiment the collapsible viewing instrument card has the dimensions roughly approximating those of a standard credit card, it may be stored within one of the standard soft film credit card compartments commonly found in wallets. It should be obvious that the collapsible viewing instrument of the instant invention may accommodate additional tools which may be integral or separable from the blank surface including such items as a ruler, a small knife, direction-indicating tools, identifying indicia, a screw driver and other tools. Exemplary modifications, enumerated herein, have been given to illuminate rather than to limit the scope of the invention.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A collapsible viewing instrument comprising:
   a blank of semi-rigid material, said blank having a length and a width;
   a first pivoting frame, said first pivoting frame having an ocular lens and a plurality of sides, one of said plurality of sides being straight and comprising a first joining means by which said first pivoting frame is joined to said blank;
   a second pivoting frame, said second pivoting frame having an objective lens and a plurality of sides, one of said plurality of sides being straight and comprising a second joining means by which said second pivoting frame is joined to said blank;
   said first and said second joining means being distally oriented along said length of said blank whereby said first and second pivoting frames may be pivoted from a first, collapsed position parallel to said blank upwardly and away from each other to a second position such that when said first and said second pivoting frames are positioned in said first, collapsed position, said collapsible viewing instrument is flat and in the form of a single layer of material and when said first and said second pivoting frames are positioned in said second position said ocular lens is in register along a common optical axis with said objective lens; and
   means to maintain said first and said second pivoting frames in said second position.

2. The collapsible viewing instrument in accordance with claim 1, wherein said first and second joining means are in the form of etch lines, said etch lines being integral with said blank.

3. The collapsible viewing instrument in accordance with claim 2, wherein said etch lines are locking etch lines, said locking etch lines being configured so as to respectively secure said first and second pivoting frames in either of said first, collapsed position or said second position.

4. The collapsible viewing instrument in accordance with claim 1, wherein said first and second joining means are in the form of hinges respectively joining said first pivoting frame and said second pivoting frame to said blank.

5. The collapsible viewing instrument in accordance with claim 4, wherein said hinges are locking hinges, said locking hinges being configured so as to respectively secure said first and second pivoting frames in either of said first, collapsed position or said second position.

6. The collapsible viewing instrument in accordance with claim 1, wherein said length and said width dimensions approximate those of a standard credit card.

7. The collapsible viewing instrument in accordance with claim 1, further comprising securing means to maintain each of said first and second pivoting frames in said first, collapsed position.

8. The collapsible viewing instrument in accordance with claim 7, wherein said securing means for maintaining said first and second pivoting frames in said first, collapsed position comprises at least two projections disposed within said blank and at least two cavities, at least one of said cavities being disposed within each of said first and second pivoting frames, said projections and said cavities being arranged in such a manner that said each of said projections interengage a complementary one of said cavities to maintain said first and second pivoting frames in said first, collapsed position.

9. A collapsible viewing instrument comprising:
   a blank of semi-rigid material, said blank having a surface, a first etched fold line and a second etched fold line, said first etched fold line and said second etched fold line being parallel to one another and dividing said blank into a top domain, a bottom domain and a central domain, said first etched fold line bounding and being integral to said top domain to define a length of said top domain, said second etched fold line bounding and being integral to said bottom domain to define a length of said bottom domain, said central domain being bounded along opposing sides by and integral with said first etched fold line and said second etched fold line, whereby said first etched fold line and said second etched fold line define a length of said central domain, said central domain further comprising:

a first pivoting frame pivotable from a first, collapsed position parallel to said surface of said blank to a second position perpendicular to said surface, said first pivoting frame having a first and second side, a first connecting side and a first joining side, each of said first and second sides of said first pivoting frame having a first end and a second end, said respective first ends being connected by said first connecting side and said respective second ends being joined by said first joining side;

means to secure said first pivoting frame in said second position;

a second pivoting frame pivotable from a first, collapsed position parallel to said surface of said blank to a second position perpendicular to said surface, said second pivoting frame having a first and second side, a second connecting side and a second joining side, each of said first and second sides of said second pivoting frame having a first end and a second end, said respective first ends being connected by said second connecting side and said respective second ends being joined by said second joining side;

means to secure said second pivoting frame in said second position;

wherein said first and second pivoting frames are arranged within said central domain along said length, said first and second connecting sides being proximal to each other and said first and second joining sides being distal to each other, said first pivoting frame having an ocular lens and said second pivoting frame having an objective lens.

10. The collapsible viewing instrument in accordance with claim 9, wherein when said first and second pivoting frames are in said first, collapsed position, said collapsible viewing instrument is flat and in the form of a single layer of material.

11. The collapsible viewing instrument in accordance with claim 9, wherein said first and second joining sides are in the form of etch lines, said etch lines being integral with said central domain and enabling upward rotation of said pivoting frames from said first, collapsed position to said second position.

12. The collapsible viewing instrument in accordance with claim 9, wherein said first and second joining sides are in the form of hinges joining said first and second pivoting frames to said central domain and enabling upward rotation of said pivoting frames from said first, collapsed position to said second position.

13. The collapsible viewing instrument in accordance with claim 9, further comprising securing means to maintain each of said first and second pivoting frames in said first, collapsed position.

14. The collapsible viewing instrument in accordance with claim 13, wherein said securing means comprises at least two projections disposed within said central domain of said blank and at least two cavities, at least one cavity being disposed within each of said first and second pivoting frames, said projections and said cavities being arranged in such a manner that each of said projections interengage a complementary cavity to maintain said first and second pivoting frames in said first, collapsed position.

15. The collapsible viewing instrument in accordance with claim 9, wherein said blank has length and width dimensions approximating those of a standard credit card.

16. The collapsible viewing instrument in accordance with claim 9, further comprising locking means for maintaining said first and second pivoting frames in said second position, said locking means comprising two spaced apart apertures disposed within each of said bottom domain and top domain along their respective lengths, two complementary flanges disposed within each of said first and second pivoting frame and configured in such a manner that when said first and second pivoting frame are in said second position each of said flanges engages a respective aperture disposed in either of said bottom domain or top domain.

17. A method of using the collapsible viewing instrument in accordance with claim 16 comprising the steps of:

upwardly rotating said first and second pivoting frames from said first, collapsed positions to said second position such that said ocular lens and said objective lens are in register along a common optical axis, thereby enabling viewing along said optical axis; and engaging said locking means to maintain said first and said second pivoting frames in said second position.

* * * * *